2,869,477

CONVEYOR SYSTEMS

Arthur Thomas Charles Burrows, Stevenage, England, assignor to Geo. W. King Limited, Stevenage, England, a British company Application January 23, 1957, Serial No. 635,692

7 Claims. (Cl. 104—89)

This invention relates to conveyor systems and is concerned more particularly with reciprocating conveyors such as are described in the specification of my prior patent application No. 586,398.

In the prior specification above referred to it is proposed to provide an articulated train of carriages which is adapted to support a plurality of individual load carriers and to which a reciprocatory motion is imparted, means being provided for allowing movement of the carriers on movement of the train of carriages in one direction but for preventing reverse movement of said carriers during the reverse or return motion of said train.

With such a reciprocating conveyor it is proposed to employ load carriers of the type described in the specification of prior patent application No. 292,627, now Patent No. 2,765,111, such carrier each comprising a frame structure of substantially C shape having at its upper part a shoe element adapted to bear on rollers carried by the conveyor and at its lower part, which extends beneath the conveyor, a depending load bar capable of limited vertical displacement such bar being adapted to move downwardly against the action of a spring when a load is applied thereto and to move upwardly to its initial position upon removal of the load.

It is the object of the present invention to provide means whereby the direction of travel of a load carrier of the kind indicated above when present on a reciprocating conveyor, will be determined by whether the carrier is loaded or unloaded.

According to the present invention in a system comprising a reciprocatory conveyor adapted to support load carriers in such a manner that the latter are capable of movement relatively thereto, there is provided on each load carrier a member adapted to assume either of two limiting positions in dependence upon whether the carrier is loaded or unloaded such member being adapted in each of its limiting positions to cooperate with a different directional control means so that on reciprocation of the conveyor the direction of movement of the carrier will be determined by whether it is loaded or unloaded.

Figure 1:
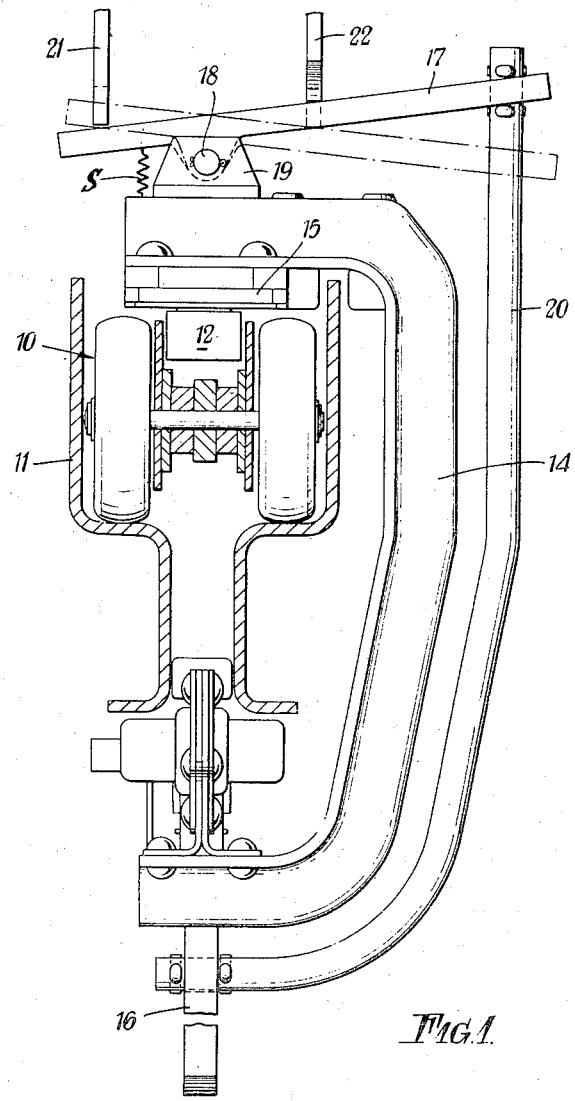
Figure 2:
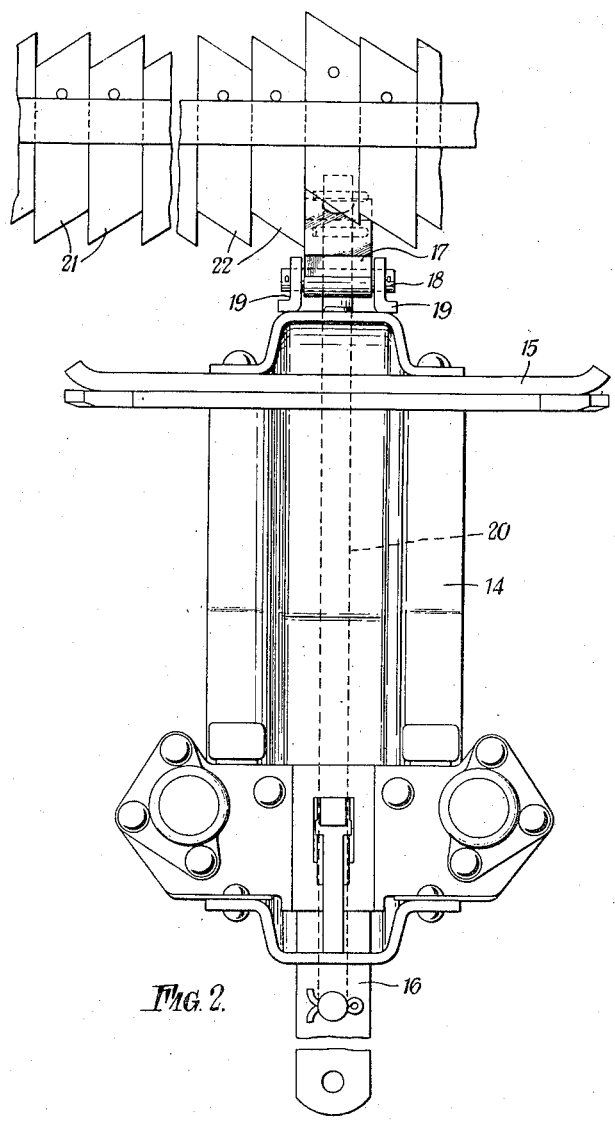

In order that the said invention may be clearly understood and readily carried into effect the same will be hereinafter more fully described with reference to the accompanying drawings in which:

Figure 1 shows a section through a reciprocating conveyor with a load carrier present thereon the load carrier being in end elevation, Figure 2 is a side elevational view of the load carrier.

Referring now to the drawings 10 generally denotes a reciprocating conveyor of the kind described in the specification of our prior patent application No. 586,398 such conveyor comprising an articulated train of carriages movable back and forth along a fixed track indicated at 11. The reciprocatory motion is conveniently imparted to the train of carriages by means of one or more fluid operated rams (not shown). Each carriage incorporates at its upper part a plurality of freely rotatable rollers, one of which is indicated generally by 12. The load carrier indicated is of the type described in the specification of prior patent application No. 292,627, now Patent No. 2,765,111, and comprises essentially a frame structure 14 of generally C shape in end elevation such frame having at its upper part a shoe element 15 which is adapted to bear on the rollers 12 carried by the conveyor. The lower limb of the load carrier is adapted to support a depending load bar 16 which is capable of limited vertical displacement being adapted to move downwardly against the action of spring S (diagrammatically illustrated) on application of a load thereto and to move upwardly under the action of spring S to its initial position on removal of such load. In the drawings the load bar 16 is shown in its uppermost or unloaded position.

As will be seen from the drawings the load carrier is provided at its upper part with a pivoted arm 17 which is disposed above the carrier and extends transversely to the intended direction of travel thereof. The arm 17 is pivoted at a point intermediate its ends on a pin 18 carried by brackets 19 secured to the upper part of the carrier. At one end said arm 17 is pivotally connected to a link 20 which as can be seen from Figure 1 is shaped to conform substantially to the shape of the carrier and is connected at its lower end to the load bar 16. It will be appreciated that by virtue of the link 20 the vertical movements of the load bar 16 will be transmitted to the arm 17 so that said arm will assume the position shown in full lines in Figure 1 when the load bar is in its uppermost or unloaded position and will move to the position shown in dotted lines when said load bar is supporting a load and is moved to its lowermost position. The load bar is spring loaded and normally urged to its uppermost position.

Disposed above the conveyor and above the upper part of the load carrier are two sets of individual plates or strip elements of the kind described in the specification of my prior patent application No. 586,398. As will be seen from Figure 1 the aforesaid sets which are designated respectively by 21, 22 are disposed at opposite sides of the pivot point of the arm 17 so that when the latter is in its depressed position illustrated in full lines and corresponding to the unloaded condition of the load bar 16 it will cooperate with the sets of plates or strip elements 22 while when said arm is in the other position illustrated in dotted lines and corresponding to the loaded condition of the load bar 16 it will cooperate with the set of plate or strip elements 21. As described in specification No. 586,398 each set of plate or strip elements is so supported in a vertical plane that each individual element is capable of vertical displacement and said elements are so shaped that when in position the lower ends thereof will form the equivalent of a row of ratchet teeth, each such tooth being however freely displaceable vertically independently of the others. As will be seen from Figure 2 plate or strip elements of the two sets are oppositely arranged so that when the arm 17 is set in its first position corresponding to the unloaded state of the load bar 16, it will cooperate with the set 22 of said elements which will be effective to allow travel of the carrier in one direction only on reciprocation of the conveyor while when the arm 17 is in its second position it will cooperate with the set 21 of said elements which will only allow travel of said carrier in the opposite direction. As described in specification No. 586,398 the plate or strip elements of each set are so formed and arranged that on movement of the reciprocating conveyor in one direction the plate or strip elements will be lifted successively by virtue of the contact of the arm 17 with the angled lower face thereof and will not impede the movement of the load carrier but on the reverse or return stroke of the conveyor the arm 17 on the load carrier will abut a vertical or substantially vertical edge portion of one of said plate or strip elements which in the circumstances will not be displaced upwardly and will act as a stop to prevent movement of the load carrier.

By virtue of the invention means are provided whereby the direction of travel of load carriers on a reciprocatory conveyor will be determined automatically in dependence upon whether the carriers are loaded or unloaded. Thus a loaded carrier on being fed to the reciprocating conveyor will be caused to travel to a preselected unloading point and after unloading it will be returned automatically along the conveyor to its initial starting point or to some other selected point.

I claim:

1. A load carrier for a conveyor system in which system stops are arranged in one of two positions adjacent an intended path of travel for the load carrier; said load carrier comprising a body for movement along said path, a load supporting member coupled to said body and displaceable between different positions in response to the association of a load therewith, a pivot on said body to occupy a position generally intermediate said two positions with the load carrier positioned in said path, a lever fulcrumed on said pivot with arms extending to opposite sides of the pivot, and means coupling said lever to said load supporting member so that movements of the load supporting member are transferred to said lever which is thereby pivoted whereby one of said arms is moved into position to engage a stop in one of said positions.

2. A carrier as claimed in claim 1 wherein said lever is mounted on said body so as to extend transverse to the intended path of travel.

3. A carrier as claimed in claim 1 wherein said body is a C-shaped member disposed in a generally vertical attitude and supporting said pivot and load support at its top and bottom respectively.

4. A carrier as claimed in claim 1 wherein said means is a rigid rod.

5. A conveyor system comprising a track, a load carrier for movement along said track, stops supported in substantially fixed but different positions relative to said track, and pivoted means on said load carrier responsive to the load condition of said carrier for selectively engaging stops in one of said positions.

6. A system as claimed in claim 5 wherein said stops are positioned on opposite sides of said track and said pivoted means extends transversely of said track to engage stops on only one side of the track for a given condition of load on the carrier.

7. A system as claimed in claim 6 wherein said pivoted means comprises a lever pivoted on said load carrier.

No references cited.